United States Patent

Takahashi

[15] 3,661,440

[45] May 9, 1972

[54] MICROSCOPE FOR INSPECTING SURFACES OF HOLES OR THE LIKE

[72] Inventor: Kinji Takahashi, Yokohama, Japan

[73] Assignee: Nippon Kogaku K.K., Tokyo, Japan

[22] Filed: Feb. 12, 1970

[21] Appl. No.: 10,914

[30] Foreign Application Priority Data

Feb. 17, 1969 Japan..................................44/11017

[52] U.S. Cl...................................................350/8, 356/241
[51] Int. Cl......................................G02b 21/00, G02b 23/00
[58] Field of Search........................................350/8; 356/241

[56] References Cited

UNITED STATES PATENTS 1,458,143  6/1923  Muller..................................350/8 UX

*Primary Examiner*—David Schonberg
*Assistant Examiner*—Toby H. Kusmen
*Attorney*—Ward, McElhannon, Brooks & Fitzpatrick

[57] ABSTRACT

A microscope especially adapted to inspect the surfaces of holes or the like is provided. A group of objectives having shorter focal lengths and including at least one objective having a magnification less than one-half in order to form an image reduced in size is combined with an eyepiece having a shorter focal length, thereby forming a magnified image. Because of the difference in magnifications at both ends of an increased depth of field, the image is exceedingly distorted so as to permit the inspection of surfaces of holes or the like.

5 Claims, 5 Drawing Figures

MICROSCOPE FOR INSPECTING SURFACES OF HOLES OR THE LIKE

BACKGROUND OF THE INVENTION

The present invention relates to generally a microscope and more particularly a microscope best suited for inspection of profiles and inner surfaces of holes or the like.

In order to inspect the complicated profiles of objects to be inspected such as inner surfaces of holes or the like, a tube inspection instrument has been for example used as an optical instrument. This instrument is best suited for inspection of the inner surface of a relatively long pipe, but is not advantageous in the inspection of the inner surfaces of shorter holes, especially tapped holes and shorter cylinders because the field is limited and the operation is not effective. The conventional microscope has for its major object to generally inspect minute constructions by enlarging the images thereof, so that the depth of focus is shorter, thereby making it difficult to inspect an object having a depth. In order to inspect such object there has been proposed a microscope having a small magnification and a small stop, but even in this system it is exceedingly difficult to obtain a depth of focus even of the order of 1 mm.

SUMMARY OF THE INVENTION

In view of the above, the primary object of the present invention is to provide a microscope by which the inner surface of a hole or the like having a depth of tens millimeters can be inspected in a simple and effective manner so that the microscope can be advantageously used in factories.

The optical system of the microscope of the present invention is so designed that the overall magnification power of the system is low, but a depth of focus in the order of tens of millimeters can be obtained. Furthermore, the image is distorted by use of the difference in magnifications in the direction of the depth so that the inner surface of a hole or the like may be well observed.

The optical system fundamentally comprises objectives and an eyepiece. The objectives are used to form an image reduced in size while the eyepiece is used to magnify this reduced image so that the optical system in total can magnify the object. The objectives consist of a number of $i$ lenses including at least one lens having a magnification less than one-half so that the overall magnification of the objective lens system may be less than one-half. The use of relay lenses having the same magnification is possible, but the objective lens system may comprise one or two lenses in practice.

The above and other objects, features and advantages of the present invention will become more apparent from the following description of one illustrative embodiment thereof taken in conjunction with the accompanying drawing.

DESCRIPTION OF THE PREFERRED EMBODIMENT

Figure 1:
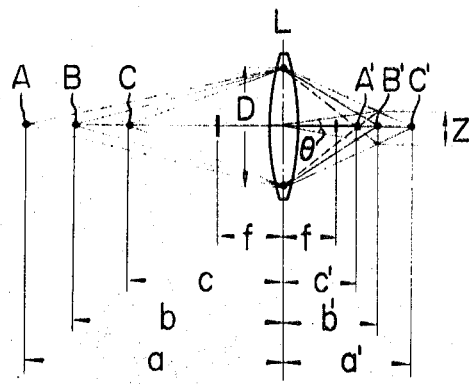
FIG. 1 is for explanation of a depth of focus.

The depth of focus will be described with reference to a photo lens shown in FIG. 1, wherein A, B and C designate the surfaces of objects, and A', B' and C', their focal planes. The focal plane B' is a reference plane. The diameter of a tolerable circle of confusion upon the focal plane B' is designated by Z; the diameter of the lens L, by D; the F-number of the lens, by F; the distances between the surfaces A, B and C and the lens L and between the focal planes A', B' and C' and the lens L, by a, b and c and a', b' and c' respectively; and the focal length of the lens L, by $f$. From the well known formulas $$(1/b') - (1/b) = 1/f,$$

$$b = c - \delta c = a + \delta a \text{ and}$$

$$Z/\delta c' = D/c'$$

we have $$c - a = bf^2 \left\{ \frac{2FZ(f+b)}{f^4 - F^2 Z^2 (f+b)^2} \right\}$$

Let us consider the case in which the distance between the surface of an object and the lens L is very long, that is the case wherein $b >> f$. Since the diameter of the circle of confusion is exceedingly smaller than the focal length $f$, let it be that $Z = \theta f$, and we have $$c - a = (2Ffb^2)/(f^2 - b^2 F^2 \theta) \quad (1)$$

From Eq. (1), the following well known conclusions can be reached:

1. The depth of focus $(c - a)$ is increased as the distance between the object and the lens is increased;
2. the depth of focus is increased when the focal length $f$ is reduced; and
3. the depth of focus is increased when the stop is reduced in diameter.

Figure 2:
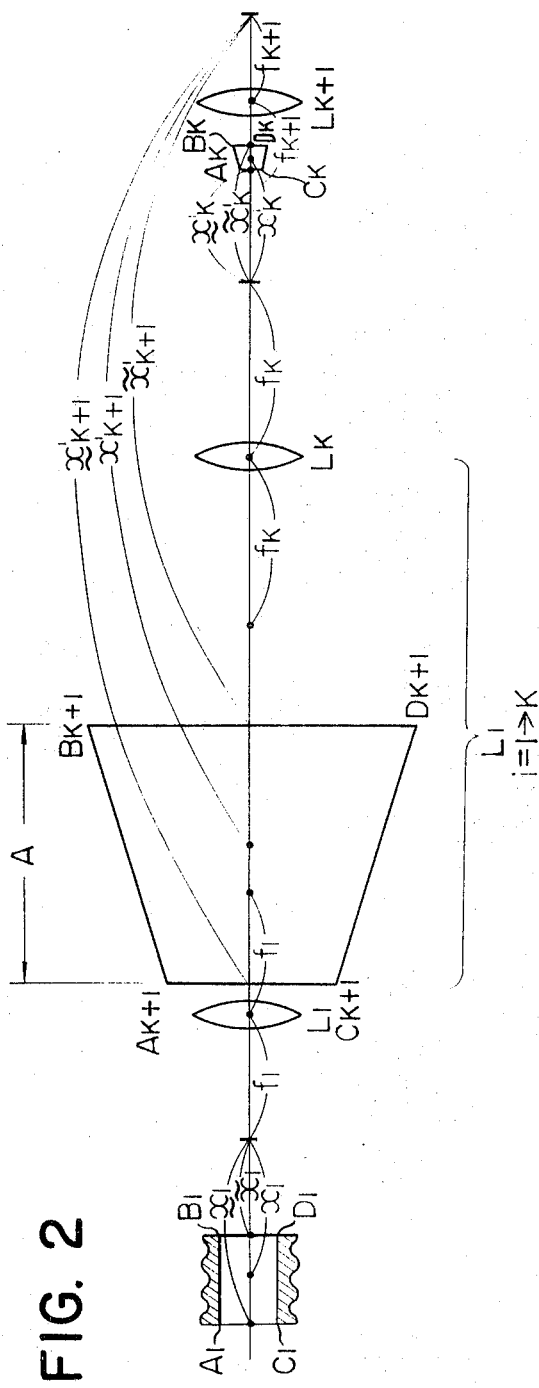
FIG. 2 is for explanation of the principle of the optical system in accordance with the present invention.

Next the principle of the present invention for reducing an image in size through a number of $i$ lenses and magnifying the image through the last lens or eyepiece so as to form a magnified virtual image, thereby observing the inner surface of an object to be inspected, will be described with reference to FIGS. 2, 3 and 4. In the figures, $A_1$, $B_1$, $D_1$ and $C_1$ designate an object to be inspected; $L_i$ $(i = 1, 2, \ldots k)$, objective lenses; $L_{+1}$, an eyepiece; $A_k$, $B_k$, $D_k$ and $C_k$, images formed through the objective $L_k$; $A_{k+1}$, $B_{k+1}$, $D_{k+1}$ and $C_{k+1}$, virtual images of the images formed through the objective $L_k$, through the eyepiece $L_{k+1}$; $f_i$, focal lengths; $x_i$, $\underline{x}_i$ and $\tilde{x}_i$, the distances between the objects and the front focal point; $x'_i$, $\underline{x}'_i$ and $\tilde{x}'_i$, the distances between the images and the back focal point; $\beta_i$, $\underline{\beta}_i$ and $\tilde{\beta}_i$, magnifications of the images; $y_i$, $\underline{y}_i$ and $\tilde{y}_i$, the heights; and $\tilde{x}'_{k+1} - \underline{x}'_{k+1} = A^*$, a value corresponding to the depth of an eye. Since $$\beta_i = f_i/x_i, \, x'_i = -\beta_i f_i, \, \tilde{x}'_i - \underline{x}'_i = \tilde{x}_{i+1} - \underline{x}_{i+1}$$
$$\tilde{\beta}_i = f_i/\tilde{x}_i, \, \tilde{x}'_i = -\tilde{\beta}_i f_i,$$
$$\underline{\beta}_i = f_i/\underline{x}_i, \, \underline{x}'_i = -\underline{\beta}_i f_i,$$

A. Longitudinal Magnification (magnification in the direction of the optical axis)

$$\tilde{x}'_k - \underline{x}'_k = (\tilde{x}_1 - \underline{x}_1) \prod_1^k \tilde{\beta}_i \underline{\beta}_i \quad (2)$$

From Eq. (2), it is seen that $\tilde{x}_1 - \underline{x}_1$ (depth of the object to be inspected) can be sufficiently increased when $$\prod_1^k \tilde{\beta}_i \underline{\beta}_i$$

is sufficiently small in order that $\tilde{x}'_k - \underline{x}'_k$ may become a given small value (which is within a depth of focus of the eyepiece $L_{k+1}$). To reduce $$\prod_1^k \tilde{\beta}_i \underline{\beta}_i,$$

it is necessary that at least one $\tilde{\beta}_i \underline{\beta}_i$ of $$\prod_1^k \tilde{\beta}_i \underline{\beta}_i$$

is small.

Figure 3:
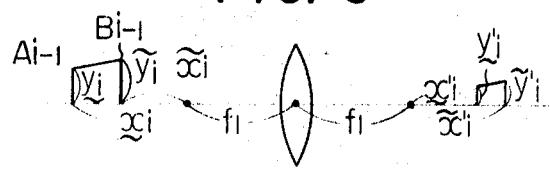
FIG. 3 is for explanation of the lateral magnification of the optical system shown in FIG. 3.

B. Lateral Magnification (Magnification in the direction at a right angle relative to the optical axis) is given by $$\left. \begin{array}{l} \underline{y}'_k = \underline{y}_1 \prod_1^k \underline{\beta}_i \\ \\ \tilde{y}'_k = \tilde{y}_1 \prod_1^k \tilde{\beta}_i \end{array} \right\} \quad (3)$$

wherein the heights are expressed in terms of $y_i$ relative to $x_i$ as shown in FIG. 3.

Figure 4:
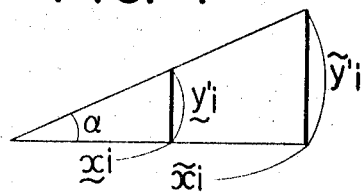
FIG. 4 is for explanation of the inclination of the image of the inner surface of a hole or the like in the optical system shown in FIG. 2.

C. Angle of Inclination of the inner surface of the image is given by $$\tan \alpha = \frac{\tilde{y}'_k - \underline{y}'_k}{\tilde{x}'_k - \underline{x}'_k} = \frac{y_1 \prod_1^k (\tilde{\beta}_i - \underline{\beta}_i)}{(\tilde{x}_1 - \underline{x}_1) \prod_1^k \tilde{\beta}_i \underline{\beta}_i} \quad (4)$$

as shown in FIG. 4.
From Eq. (4), it is seen that
1. the angle of inclination is increased when the absolute values are smaller; and
2. the angle of inclination is increased when the difference in magnifications in the direction of the depth of the object to be inspected is larger.

The conditions required in the present invention are that in order to inspect the inner surface of a cylinder having a depth of 10 mm the depth of focus must be increased and the angle of inclination must be sufficiently increased so that the inner surface of the cylinder may be observed. To increase the depth of focus, the focal length must be reduced, the distance between the object and the lens must be increased and the stop must be smaller as described hereinabove. However, a sufficient depth of focus cannot be attained by the above three conditions. Attaining a relatively deep depth of focus of the order of 10 mm in order to inspect a deep cylinder 10 mm in depth means that the above depth of focus must be within the depth of focus of the eyepiece $L_{k+1}$. Therefore, not only $$|\beta_i| \leq |$$

but also at least one $\tilde{\beta}_i \underline{\beta}_i$ of a lens $L_i$ of a number of $i$ objectives must be made small so that Eq. (2) must be satisfied.

In order to increase the angle $\alpha$ of the image of the inner surface of the cylinder so that the inner surface may be well observed, the absolute value of the magnification of at least one objective of a number of $i$ objective lenses must be made small. At the same time, the difference in magnifications in the direction of the depth of the object to be inspected must be increased. To satisfy the above conditions, at least one lens having the magnification power less than one-half must be included in the objective lens group and the over-all magnification power of the objective lens system must be so arranged as to become less than one-half.

Figure 5:
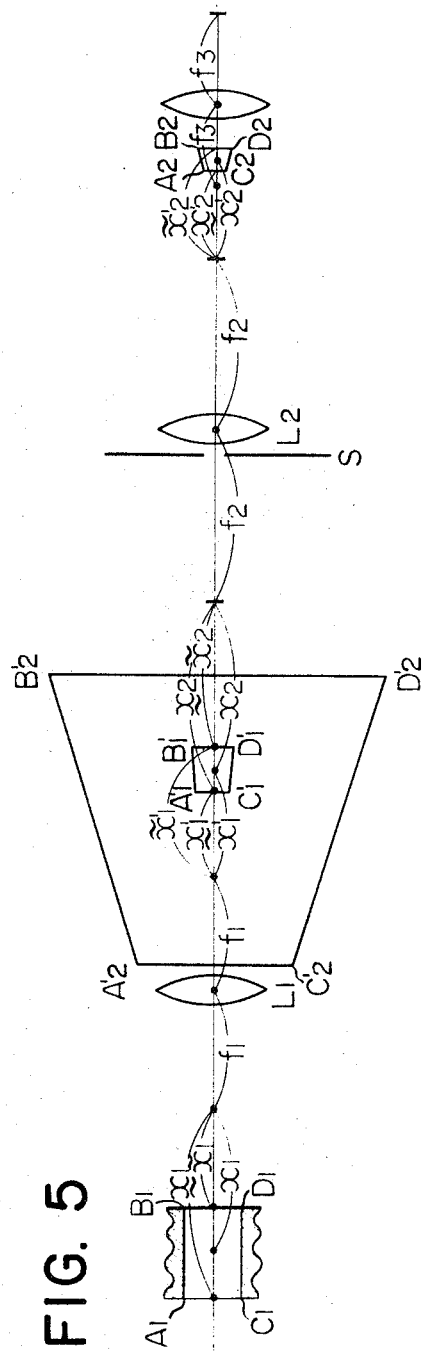
FIG. 5 is a diagrammatic view illustrating one embodiment of the present invention.

Next one embodiment of the present invention based upon the principle thereof described hereinabove will be described with reference to FIG. 5. $L_1$ and $L_2$ designate two objectives in an image reducing system, while $L_3$, an eyepiece or ocular.

The objective $L_1$ is for example an objective used in a conventional microscope having a short focal length and less aberrations and the objective $L_2$ is a lens having a relatively long focal length in order to facilitate the operation of the microscope, so that the reduction is substantially equal to that of the first objective $L_1$. But it is noted that these conditions are not necessarily satisfied. S designates an iris or fixed aperture or stop which plays a very important role in adjustment of the depth of focus. Since it is advantageous to use the eyepiece $L_3$ having a shorter focal length, in the instant embodiment, the lens $L_3$ is an integer type having a focal length of 9 mm. $A_1$, $B_1$, $D_1$ and $C_1$ designate the inner surface of a cylinder to be inspected; $A_1'$, $B_1'$, $D_1'$ and $C_1'$ the image formed by the objective $L_1$; $A_2$, $B_2$, $D_2$ and $C_2$, the image formed by the objective $L_2$; and $A_2'$, $B_2'$, $D_2'$ and $C_2'$, the image formed by the eyepiece $L_3$. Same reference numerals and characters are used to designate same parts throughout the figures.

In the instant embodiment, the microscope for inspection of holes or the like is constructed by modifying some parts of a conventional microscope's cylinder in order to facilitate the operation and to make the microscopes of the present invention widely used. The examples of the design data are shown in Table 1 where the values were obtained by the measurements while the data shown in Table 2 were obtained by calculations.

TABLE 1

|   | $L_1$ focal length (mm.) | $L_2$ focal length (mm.) | $L_3$ focal length (mm.) | N.A. | Approximate depth of focus (mm.) | Approximate maximum real field diameter (mm.) | Approximate maximum overall magnification |
|---|---|---|---|---|---|---|---|
| A | 15 | 36.5 | 9 | <0.01 | 8 | 18 | 6x |
| B | 8 | 36.5 | 9 | <0.01 | 16 | 25 | 2.5x |
| C | 4.3 | 36.5 | 9 | <0.01 | 30 | 50 | 1.5x |

TABLE 2

|   | $y_1$ | $\tilde{x}_1 - \underline{x}_1$ | $\tilde{x}_2 - \underline{x}_2$ | $\tilde{\beta}_1 \underline{\beta}_2$ | $\tilde{\beta}_1 \underline{\beta}_2$ | $\alpha_2$ |
|---|---|---|---|---|---|---|
| A | 0.8 | 8 | 0.348 | 0.183 | 0.238 | 7.2° |
| B | 1.6 | 16 | 0.08 | 0.072 | 0.114 | 7.3° |
| C | 3.0 | 30 | 0.09 | 0.034 | 0.092 | 61° |

From the foregoing, it will be seen that the optical system having an exceedingly deep depth of focus is provided so that the inner surface of an object to be inspected may be observed due to the difference in magnifications at both ends of the depth of focus.

What is claimed is:

1. A microscope optical system for observing the inner surface of a hole, which comprises:

a group of objectives forming a final image of an object reduced in size as compared with the object, said group including a first objective for forming a first intermediate image of the object and a second objective for forming a second intermediate image, said first objective having a shorter focal length than a half of that of said second objective and located in a relative position in which its magnification is less than one-half to obtain large depth of focus and cause the difference in lateral magnification between the images at both ends of the depth of focus; and an eyepiece having a shorter focal length than that of said second objective, whereby the overall magnification of said optical system is larger than 1.

2. A microscope optical system according to claim 1 wherein said second objective has an aperture stop to adjust the depth of focus.

3. A microscope optical system according to claim 1, wherein the focal lengths of said first and second objectives and said eyepiece are 15 mm, 36.5 mm and 9 mm, respectively, the overall magnification of said optical system being 6.

4. A microscope optical system according to claim 1, wherein the focal lengths of said first and second objectives and said eyepiece are 8 mm, 36.5 mm and 9 mm, respectively, the overall magnification of said optical system being 2.5.

5. A microscope optical system according to claim 1, wherein the focal lengths of said first and second objectives and said eyepiece are 4.3 mm, 36.5 mm and 9 mm, respectively, the overall magnification of said optical system being 1.5.

* * * * *